(12) United States Patent
Hong et al.

(10) Patent No.: US 11,601,492 B2
(45) Date of Patent: Mar. 7, 2023

(54) METHOD, APPARATUS, AND DEVICE FOR DETERMINING QUALITY OF AUDIO AND VIDEO STREAM, AND COMPUTER-READABLE STORAGE MEDIUM

(71) Applicant: HUAWEI TECHNOLOGIES CO., LTD., Guangdong (CN)

(72) Inventors: Hanshu Hong, Nanjing (CN); Zhenwei Zhang, Nanjing (CN); Tengxiang Zhang, Nanjing (CN); Feng Dong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/342,444

(22) Filed: Jun. 8, 2021

(65) Prior Publication Data

US 2021/0385265 A1    Dec. 9, 2021

(30) Foreign Application Priority Data

Jun. 8, 2020  (CN) .......................... 202010514106.9

(51) Int. Cl.
*H04L 65/80*        (2022.01)
*G06N 20/00*        (2019.01)
(Continued)

(52) U.S. Cl.
CPC .............. *H04L 65/80* (2013.01); *G06N 20/00* (2019.01); *G06V 20/46* (2022.01); *G10L 25/57* (2013.01);
(Continued)

(58) Field of Classification Search
CPC ......... H04L 65/80; H04L 41/06; H04L 43/08; H04L 65/612; H04L 41/5067;
(Continued)

(56) References Cited

U.S. PATENT DOCUMENTS 8,543,682 B2 * 9/2013 Menon .................... H04L 1/203
                                                  709/224
9,237,339 B1    1/2016 Bordner-Babayigit et al.
(Continued)

FOREIGN PATENT DOCUMENTS

CN         101697554 A    4/2010
CN         102111381 A    6/2011
(Continued)

OTHER PUBLICATIONS

China Unicom,"Updates to baseline text for G.IPTV-MP",SG 12-C435R1,Study Group 12,Geneva, Nov. 26-Dec. 5, 2019,total 22 pages.
(Continued)

*Primary Examiner* — Javier O Guzman
(74) *Attorney, Agent, or Firm* — Gregg L. Jansen

(57) ABSTRACT

A method for determining quality of an audio and video stream includes: obtaining a key indicator for a target audio and video stream, the key indicator including at least one of the following indicators within a reference time period: a maximum quantity of continuously lost packets, an average packet receiving time interval, an average packet receiving time interval variance, or a quantity of stream interruptions; and determining a QoE of the target audio and video stream based on the key indicator.

19 Claims, 3 Drawing Sheets

(51) Int. Cl.
  *G10L 25/57* (2013.01)
  *G10L 25/60* (2013.01)
  *H04L 41/06* (2022.01)
  *H04L 43/08* (2022.01)
  *G06V 20/40* (2022.01)

(52) U.S. Cl.
  CPC .............. *G10L 25/60* (2013.01); *H04L 41/06* (2013.01); *H04L 43/08* (2013.01)

(58) Field of Classification Search
  CPC ............ H04L 43/0829; H04L 43/0858; H04L 43/087; H04L 65/762; G06N 20/00; G06V 20/46; G10L 25/57; G10L 25/60
  See application file for complete search history.

(56) References Cited

U.S. PATENT DOCUMENTS

| | | | | |
|---|---|---|---|---|
| 10,834,265 | B1* | 11/2020 | Antunes | H04M 3/2236 |
| 2006/0153174 | A1* | 7/2006 | Towns-von Stauber | H04L 1/20 |
| | | | | 370/356 |
| 2008/0162714 | A1* | 7/2008 | Pettersson | H04L 65/80 |
| | | | | 709/231 |
| 2010/0269044 | A1 | 10/2010 | Ivanyi et al. | |
| 2012/0110167 | A1* | 5/2012 | Joch | H04L 43/065 |
| | | | | 709/224 |
| 2012/0278441 | A1* | 11/2012 | Li | H04N 21/2662 |
| | | | | 709/219 |
| 2013/0067109 | A1* | 3/2013 | Dong | H04L 65/80 |
| | | | | 709/231 |
| 2013/0091528 | A1* | 4/2013 | Honda | H04N 21/6437 |
| | | | | 725/85 |
| 2013/0148525 | A1* | 6/2013 | Cuadra Sanchez | H04L 41/5067 |
| | | | | 370/252 |
| 2014/0122594 | A1* | 5/2014 | Uzunalioglu | H04L 41/5067 |
| | | | | 709/204 |
| 2015/0373565 | A1* | 12/2015 | Safavi | H04W 24/08 |
| | | | | 370/252 |
| 2016/0105728 | A1* | 4/2016 | Schmidmer | H04N 21/44209 |
| | | | | 725/110 |
| 2017/0078171 | A1* | 3/2017 | Tapia | H04L 65/80 |
| 2017/0093648 | A1* | 3/2017 | ElArabawy | H04L 41/16 |
| 2020/0162535 | A1 | 5/2020 | Ma et al. | |

FOREIGN PATENT DOCUMENTS

| | | |
|---|---|---|
| CN | 103050128 A | 4/2013 |
| CN | 103151049 A | 6/2013 |
| WO | 2019176997 A1 | 9/2019 |

OTHER PUBLICATIONS

Yao Liang et al., Development and Application of Built-in Quality Monitoring Tool for IPTV STB, Telecom Science, Nov. 15, 2008, with an English translation total 10 pages.

* cited by examiner

METHOD, APPARATUS, AND DEVICE FOR DETERMINING QUALITY OF AUDIO AND VIDEO STREAM, AND COMPUTER-READABLE STORAGE MEDIUM

CROSS-REFERENCE TO RELATED APPLICATION

This application claims priority to Chinese Patent Application No. 202010514106.9, filed on Jun. 8, 2020, which is hereby incorporated by reference in its entirety.

TECHNICAL FIELD

This application relates to the field of multimedia technologies, and in particular, to a method, apparatus, and device for determining quality of an audio and video stream, and a computer-readable storage medium.

BACKGROUND

With the development of multimedia technologies, higher requirements are imposed on audio-visual experiences. In a process of transmitting an audio and video stream, a quality of experience (QoE) of the audio and video stream is usually determined, so that adaptive adjustment is performed promptly when the QoE is relatively poor, in order to provide better audio-video experiences. Therefore, how to accurately determine QoE of an audio and video stream becomes an urgent problem to be resolved.

SUMMARY

This application provides a method, apparatus, and device for determining quality of an audio and video stream, and a computer-readable storage medium, to improve accuracy of determined QoE. Technical solutions are as follows:

According to a first aspect, a method for determining quality of an audio and video stream is provided. In an example in which a network device performs the method, the method includes: obtaining a key indicator for a target audio and video stream; and determining QoE of the target audio and video stream based on the key indicator for the target audio and video stream. The key indicator includes at least one of the following indicators within a reference time period: a maximum quantity of continuously lost packets, an average packet receiving time interval, an average packet receiving time interval variance, and a quantity of stream interruptions.

The QoE of the target audio and video stream is determined based on at least one of the following indicators: the maximum quantity of continuously lost packets, the average packet receiving time interval, the average packet receiving time interval variance, and the quantity of stream interruptions. In this way, the determined QoE is relatively accurate.

For example, a packet loss rate can reflect only an average QoE within a time period, and cannot reflect a sudden QoE change status at each time point in the time period. In other words, a granularity of the packet loss rate in the time period is relatively coarse, and therefore accuracy of determined QoE is affected. Compared with the single packet loss rate, the maximum quantity of continuously lost packets can reflect a case of continuous packet loss that can directly indicate a QoE change status, so that a QoE that is determined based on the maximum quantity of continuously lost packets is more practical and accurate.

For another example, because both the average packet receiving time interval and the average packet receiving time interval variance can reflect a network status, the QoE of an audio and video stream is further reflected. Therefore, a more accurate QoE is determined based on at least one of: the average packet receiving time interval and the average packet receiving time interval variance.

For another example, in a process of transmitting an audio and video stream in a streaming media manner, a source code rate of the audio and video stream may be changed by a device for generating the audio and video stream, and transmission rates of different data packets included in the audio and video stream are different. This causes a frame freezing phenomenon. Alternatively, if network quality deteriorates in the process of transmitting an audio and video stream, a transmit end of the audio and video stream stops sending a data packet, or re-establishes a connection to a receive end of the audio and video stream for transmitting a data packet. This also causes a frame freezing phenomenon. The quantity of stream interruptions can reflect the frame freezing phenomenon at a finer granularity. Therefore, a more accurate QoE is determined based on the quantity of stream interruptions.

In an embodiment, the obtaining a key indicator for a target audio and video stream includes: collecting feature information of the target audio and video stream, where the feature information includes a quantity of data packets received by a receive end of the target audio and video stream within the reference time period, and includes a sequence number corresponding to the data packet received by the receive end; and calculating, based on the feature information, at least one of the following: a maximum quantity of continuously lost packets, an average packet receiving time interval, an average packet receiving time interval variance, or a quantity of stream interruptions, and using at least one indicator obtained through calculation as the key indicator for the target audio and video stream.

In an embodiment, the maximum quantity of continuously lost packets is used to indicate a maximum quantity of continuously lost data packets of the target audio and video stream within the reference time period, and the lost data packet is a data packet that has been sent by a transmit end of the target audio and video stream but has not been received by the receive end of the target audio and video stream.

In an embodiment, the average packet receiving time interval is used to indicate an average value of a plurality of receiving time intervals that are used for receiving the target audio and video stream and that are in any sub-time period in the reference time period, and each of the plurality of receiving time intervals is used to indicate an interval between time points for receiving two adjacent data packets.

In an embodiment, the average packet receiving time interval variance is a variance of a plurality of average packet receiving time intervals within the reference time period, and one of the plurality of average packet receiving time intervals corresponds to one sub-time period in the reference time period.

In an embodiment, the quantity of stream interruptions is a quantity of times that duration in which the receive end of the target audio and video stream receives no data packet within the reference time period is greater than a time threshold.

In an embodiment, the key indicator further includes at least one of the following: a packet loss rate, an average delay, or an average jitter.

In an embodiment, the key indicator includes at least two indicators, and the determining quality of experience (QoE) of the target audio and video stream based on the key indicator for the target audio and video stream includes: determining a uniform reference unit for various indicators for the target audio and video stream; performing weighted summation on the various indicators after the uniform reference unit is determined to obtain a summation score; using a difference between a full score and the summation score as a score of the target audio and video stream; and indicating the QoE of the target audio and video stream using the score of the target audio and video stream, where a full score is used to indicate an upper limit of the QoE.

In an embodiment, the determining the QoE of the target audio and video stream based on the key indicator for the target audio and video stream includes: inputting the key indicator into a trained quality determining model; using a score output by the quality determining model as a score of the target audio and video stream; and indicating the QoE of the target audio and video stream using the score of the target audio and video stream.

In an embodiment, after the determining the QoE of the target audio and video stream based on the key indicator, the method further includes generating an alarm when the QoE of the target audio and video stream does not meet a requirement.

According to a second aspect, an apparatus for determining quality of an audio and video stream is provided. The apparatus includes an obtaining module configured to obtain a key indicator for a target audio and video stream, the key indicator including at least one of the following indicators within a reference time period: a maximum quantity of continuously lost packets, an average packet receiving time interval, an average packet receiving time interval variance, or a quantity of stream interruptions. The apparatus further includes a determining module configured to determine a QoE of the target audio and video stream based on the key indicator.

In an embodiment, the obtaining module is configured to: collect feature information of the target audio and video stream, where the feature information includes a quantity of data packets received by a receive end of the target audio and video stream within the reference time period and a sequence number corresponding to the data packet received by the receive end; and calculate, based on the feature information, at least one of the following indicators: the maximum quantity of continuously lost packets, the average packet receiving time interval, the average packet receiving time interval variance, or the quantity of stream interruptions, and use the at least one indicator obtained through calculation as the key indicator for the target audio and video stream.

In an embodiment, the maximum quantity of continuously lost packets is used to indicate a maximum quantity of continuously lost data packets of the target audio and video stream within the reference time period, and the lost data packet is a data packet that has been sent by a transmit end of the target audio and video stream but has not been received by the receive end of the target audio and video stream.

In an embodiment, the average packet receiving time interval is used to indicate an average value of a plurality of receiving time intervals that are used for receiving the target audio and video stream and that are in any sub-time period in the reference time period, and each of the plurality of receiving time intervals is used to indicate an interval between time points for receiving two adjacent data packets.

In an embodiment, the average packet receiving time interval variance is a variance of a plurality of average packet receiving time intervals within the reference time period, and one of the plurality of average packet receiving time intervals corresponds to one sub-time period in the reference time period.

In an embodiment, the quantity of stream interruptions is a quantity of times that duration in which the receive end of the target audio and video stream receives no data packet within the reference time period is greater than a time threshold.

In an embodiment, the key indicator further includes at least one of the following indicators: a packet loss rate, an average delay, and an average jitter.

In an embodiment, the key indicator includes at least two indicators. The determining module is configured to: determine a uniform reference unit for various indicators for the target audio and video stream, and perform weighted summation on the various indicators after the uniform reference unit is determined, to obtain a summation score; and use a difference between a full score and the summation score as a score of the target audio and video stream, and indicate the QoE of the target audio and video stream by using the score of the target audio and video stream, where the full score is used to indicate an upper limit of the QoE.

In an embodiment, the determining module is configured to: input the key indicator into a trained quality determining model; and use a score output by the quality determining model as a score of the target audio and video stream, and indicate the QoE of the target audio and video stream by using the score of the target audio and video stream.

In an embodiment, the apparatus further includes: an alarm module, configured to generate an alarm when the QoE of the target audio and video stream does not meet a requirement.

According to a third aspect, a network device is provided. The network device includes a memory and a processor. The memory stores at least one instruction, and the processor loads and executes the at least one instruction to implement the method provided in any one of the first aspect or the embodiments of the first aspect in this application.

According to a fourth aspect, a communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method in any one of the first aspect or the embodiments of the first aspect.

Optionally, there are one or more processors and one or more memories.

Optionally, the memory may be integrated with the processor, or the memory and the processor may be separately disposed.

In an implementation process embodiment, the memory may be a non-transitory memory, such as a read-only memory (ROM). The memory and the processor may be integrated into one chip, or may be disposed in different chips. A type of the memory and a manner in which the memory and the processor are disposed are not limited in this application.

According to a fifth aspect, a computer program product is provided, where the computer program product includes computer program code. When the computer program code is run by a computer, the computer is enabled to perform the methods in the foregoing aspects.

According to a sixth aspect, a computer-readable storage medium is provided. The computer-readable storage medium stores programs or instructions. When the programs or the instructions are run on a computer, the methods in the foregoing aspects are performed.

According to a seventh aspect, a chip is provided, including a processor, configured to invoke and run instructions stored in a memory, so that a communications device in which the chip is installed performs the methods in the foregoing aspects.

According to an eighth aspect, a chip is provided, including an input interface, an output interface, a processor, and a memory. The input interface, the output interface, the processor, and the memory are connected through an internal connection channel. The processor is configured to execute code in the memory, and when the code is executed, the processor is configured to perform the methods in the foregoing aspects.

DESCRIPTION OF EMBODIMENTS

Terms used in DESCRIPTION OF EMBODIMENTS of this application are only used to explain specific embodiments of this application, and are not intended to limit this application.

Figure 1:
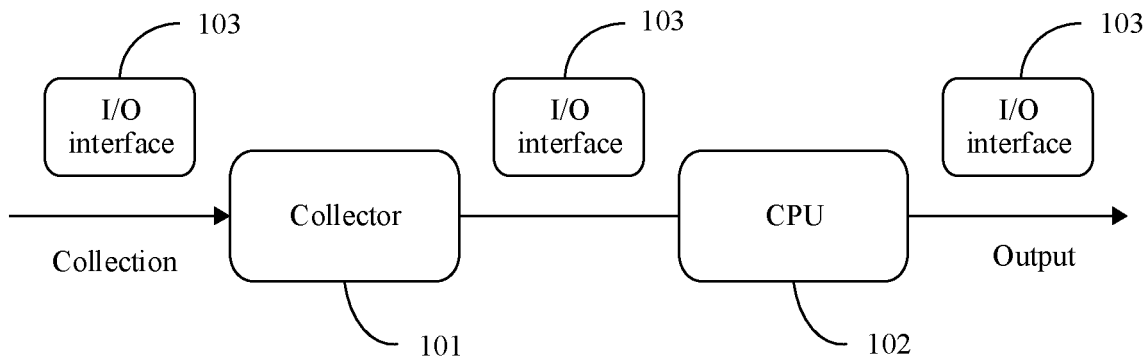
FIG. 1 is a schematic diagram of a hardware implementation environment according to an embodiment of this application.

An embodiment of this application provides a method for determining quality of an audio and video stream. The method may be applied to a hardware implementation environment shown in FIG. 1. In FIG. 1, the hardware implementation environment includes a collector 101, a central processing unit (CPU) 102, and an input/output interface (I/O interface) 103. The collector 101 is configured to collect feature information through the I/O interface 103, and then send the collected feature information to the CPU 102 through the I/O interface 103. Then, the CPU 102 is configured to perform calculation based on the received feature information to obtain a key indicator, and further determine QoE of an audio and video stream based on the key indicator. In addition, the CPU 102 is further configured to output a target score through the I/O interface 103.

Figure 2:
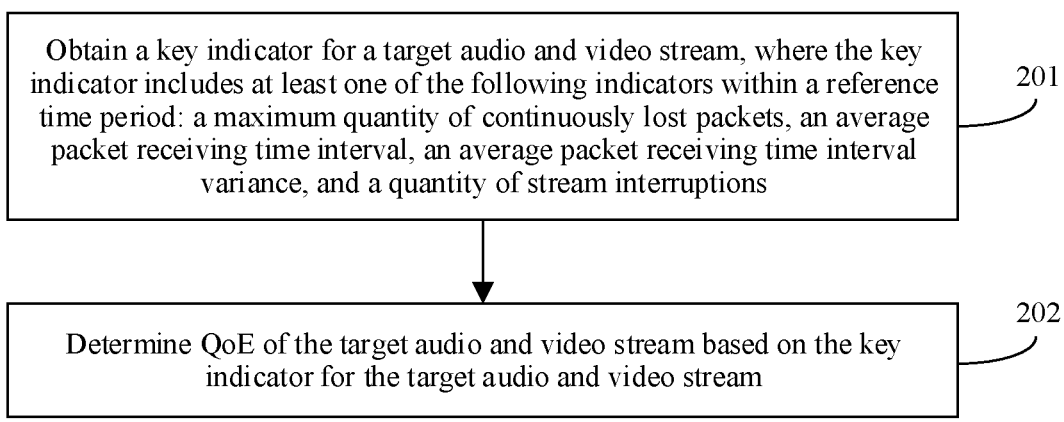
FIG. 2 is a flowchart of a method for determining quality of an audio and video stream according to an embodiment of this application.

Based on the hardware structure shown in FIG. 1, an embodiment of this application provides a method for determining quality of an audio and video stream. The method can be applied to a network device having the hardware structure shown in FIG. 1. As shown in FIG. 2, the method includes the following several processes 201 and 202.

201: Obtain a key indicator for a target audio and video stream, where the key indicator includes at least one of the following indicators within a reference time period: a maximum quantity of continuously lost packets, an average packet receiving time interval, an average packet receiving time interval variance, and a quantity of stream interruptions.

The target audio and video stream includes a plurality of data packets, and the plurality of data packets are transmitted one by one from a transmit end to a receive end in a streaming media manner. The data packet includes any one of audio data, video data, or data obtained by mixing the audio data and the video data. Content or a format of the target audio and video stream is not limited in this embodiment.

Through obtaining the key indicator, within the reference time period, of the target audio and video stream, QoE of the target audio and video stream can be subsequently determined based on the obtained key indicator. Duration of the reference time period is not limited in this embodiment, and may be selected according to an actual requirement or experience. For example, the duration of the reference time period is 60 s (unit: second), or is a value other than 60 s.

For example, the key indicators include one, two, three, or four of the maximum quantity of continuously lost packets, the average packet receiving time interval, the average packet receiving time interval variance, and the quantity of stream interruptions within a reference time period. Certainly, in addition to at least one of the foregoing four indicators, in a possible implementation, the key indicator further includes at least one of the following indicators: a packet loss rate, an average delay, and an average jitter. For example, in this embodiment, the maximum quantity of continuously lost packets, the average packet receiving time interval, the average packet receiving time interval variance, and the quantity of stream interruptions, the packet loss rate, the average delay, and the average jitter are all used as key indicators for the target audio and video stream. In this case, the key indicators for the target audio and video stream include seven different indicators.

It can be understood that the foregoing seven indicators are merely examples, and a quantity of indicators or indicators included in the key indicators is not limited in this embodiment. Another indicator other than the indicator in the foregoing example may also be used as the key indicator for calculating the QoE of the target audio and video stream.

In a possible implementation, the obtaining a key indicator for a target audio and video stream includes the following steps shown in 2011 and 2012.

2011: Collect feature information of the target audio and video stream, where the feature information includes a quantity of data packets received by the receive end of the target audio and video stream within the reference time period and a sequence number corresponding to the data packet received by the receive end.

Because the target audio and video stream includes a plurality of data packets, each data packet corresponds to a sequence number. For example, the sequence number corresponding to the data packet is used to indicate a sequence in which the data packet is sent. For example, a sequence number corresponding to a first sent data packet is 1, a sequence number corresponding to a second sent data packet is 2, and so on.

For example, a counter is configured for the receive end of the target audio and video stream. Therefore, the receive end determines, by using the counter, a quantity of data packets received by the receive end. Alternatively, the receive end can obtain a quantity of data packets through calculation based on sequence numbers corresponding to the data packets. For example, if a sequence number corresponding to a data packet that is first received by the receive end within the reference time period is 1, and a sequence number corresponding to a last received data packet is 5, the receive end can obtain through calculation that a quantity of received data packets is 5.

The foregoing feature information is information used to calculate the maximum quantity of continuously lost packets, the average packet receiving time interval, the average packet receiving time interval variance, and the quantity of stream interruptions in the reference time period. For a case in which the key indicator includes the packet loss rate, the average delay, and the average jitter, the feature information further includes: a quantity of data packets sent by the transmit end of the target audio and video stream within the reference time period and a delay of each data packet, and the delay includes but is not limited to a transmission time of the data packet between the transmit end and the receive end.

The quantity of the audio and video data packets sent by the transmit end may alternatively be determined through counting by using the counter, or may be determined by using sequence numbers of the data packets. Details are not described herein. For a delay of the data packet, the transmit end adds a timestamp to the data packet during sending the data packet. The timestamp is used to indicate a time at which the data packet is sent. Therefore, after receiving the data packet, the receive end can determine the transmission time of the data packet between the transmit end and the receive end by calculating a difference between a receiving time of the data packet and the sending time indicated by the timestamp.

It should be noted that the network device can collect the feature information by receiving the feature information reported by the transmit end and the receive end of the target audio and video stream. Alternatively, the network device may further separately send a feature information obtaining request to the transmit end and the receive end, and receive, based on the obtaining request, feature information returned by the transmit end and the receive end. In this way, various types of feature information are collected. After the feature information is collected, the key indicator can be further determined based on the feature information. For details, refer to step 2012.

2012: Calculate, based on the feature information, at least one of the following indicators: the maximum quantity of continuously lost packets, the average packet receiving time interval, the average packet receiving time interval variance, and the quantity of stream interruptions, and use at least one indicator obtained through calculation as the key indicator for the target audio and video stream.

It can be understood that, when any indicator is calculated based on the feature information, calculation is performed based on one or more types of feature information. In other words, not all key indicators are calculated based on all types of feature information. The following separately describes definitions and calculation processes of the foregoing seven indicators.

Packet loss rate: A packet loss rate indicates a ratio of lost data packets within the reference time period to all data packets sent by the transmit end. During calculation of the packet loss rate, a ratio of a quantity of data packets received by the receive end to the quantity of data packets sent by the transmit end is determined, and the packet loss rate is determined based on the ratio.

The lost data packet refers to a data packet that has been sent by the transmit end of the target audio and video stream but has not been received by the receive end of the target audio and video stream. A process of determining the packet loss rate based on the ratio includes: determining a percentage of a difference between 1 and the ratio as the packet loss rate. For example, if the transmit end has sent 100 data packets within the reference time period, and the receive end has received 90 data packets within the reference time period, the packet loss rate is $1-90/100=10\%$.

Maximum quantity of continuously lost packets: The maximum quantity of continuously lost data packets indicates a maximum quantity of continuously lost packets in the target audio and video streams within the reference time period. During calculation, a sequence number difference between sequence numbers corresponding to every two adjacent data packets received by the receive end is first calculated, to obtain a plurality of sequence number differences. Then, a maximum sequence number difference in the plurality of sequence number differences is used as the maximum quantity of continuously lost packets.

For example, the reference time period includes a plurality of sub-time periods. For example, the reference time period is 60 s, and the reference time period includes six sub-time periods whose duration is 10 s. In this embodiment, one or more quantities of continuously lost packets are obtained in each sub-time period, and a plurality of quantities of continuously lost packets are obtained in the plurality of sub-time periods. Then, a largest quantity of continuously lost packets in the plurality of quantities of continuously lost packets is used as the maximum quantity of continuously lost packets within the reference time period. Certainly, the foregoing case is merely an example. In this embodiment, a quantity of continuously lost packets may be recorded each time a data packet loss is detected within the reference time period. At the end of the reference time period, a largest quantity of continuously lost packets is selected from recorded quantities of continuously lost packets as the maximum quantity of continuously lost packets.

For example, in this embodiment, a sequence number $X_n$ corresponding to an $n^{th}$ data packet received by the receive end and a sequence number $X_{n+k}$ corresponding to an $(n+1)^{th}$ data packet received by the receive end are recorded. The $n^{th}$ data packet and the $(n+1)^{th}$ data packet are two adjacent data packets received by the receive end, and n and n+k are used to distinguish sequence numbers corresponding to different data packets. Then, a sequence number difference between the sequence number corresponding to the $n^{th}$ received data packet and the sequence number corresponding to the $(n+1)^{th}$ received data packet is calculated. To be specific, the sequence number difference is $k_{n+1}=X_n-X_{n+k}$.

According to this calculation manner, a plurality of sequence number differences can be obtained through calculation based on a plurality of data packets received within the reference time period. For example, if m data packets are received, (m−1) sequence number differences can be obtained through calculation. Then, a maximum sequence number difference is selected from the plurality of sequence number differences as the maximum quantity of continuously lost packets. n, k, and m are all positive integers not less than 1, and values of n, k, and m are not limited in this embodiment.

It should be noted that a reason of using the maximum quantity of continuously lost packets as one of the key indicators in this embodiment is as follows: The packet loss rate can reflect only average QoE within a time period, but cannot reflect a sudden QoE change status at each time point in the time period. A granularity of the packet loss rate in the time period is relatively coarse, and therefore accuracy of determined QoE is affected.

For example, a data packet is received at a fixed receiving speed. If no data packet is received for 0.5 s within a reference time period of 10 s, a packet loss rate is 5%. Therefore, if the QoE is determined by using only the packet loss rate, it is usually determined that the QoE is relatively good because the packet loss rate of 5% is relatively small. However, in practice, QoE in duration is to 2s earlier or later than the duration of 0.5 s in which no data packet is received is affected, causing poor audio-visual experience of a user. In this case, it is determined, based on the maximum quantity of continuously lost packets, that the QoE is relatively poor, which is consistent with an actual situation. It can be learned that, using the maximum quantity of continuously lost packets as the key indicator for determining the QoE can make the determined QoE more practical and accurate.

Based on this reason, in addition to the maximum quantity of continuously lost packets, another indicator, for example, maximum continuous packet loss duration, that can reflect a sudden QoE change status, may be used as a key indicator for determining the QoE of the target audio and video stream in this embodiment.

Average packet receiving time interval: The average packet receiving time interval is used to indicate an average value of a plurality of receiving time intervals that are used for receiving the target audio and video stream and that are in any sub-time period in the reference time period, and each of the plurality of receiving time intervals is used to indicate an interval between time points for receiving two adjacent data packets. During calculation of the average packet receiving time interval, duration of a sub-time period needs to be determined, and a ratio of the duration of the sub-time period to the quantity of data packets received by the receive end is used as the average packet receiving time interval.

For example, if the duration of the sub-time period is 1000 ms (unit: ms), and the quantity of data packets received by the receive end within 1000 ms is 50, the average packet receiving time interval is: 1000/50=20 ms.

Average packet receiving time interval variance: The average packet receiving time interval variance is a variance of a plurality of average packet receiving time intervals within the reference time period, and one of the plurality of average packet receiving time intervals corresponds to one sub-time period in the reference time period. A variance corresponding to a plurality of average packet receiving time intervals is calculated, and the variance obtained through calculation can be used as the average packet receiving time interval variance.

It can be understood that, an average packet receiving time interval can be obtained through calculation in each sub-time period of the reference time period, and at least two average packet receiving time intervals are required for calculating the average packet receiving time interval variance. Therefore, there are also at least two sub-time periods included in the reference time period. Therefore, the average packet receiving time interval variance can be obtained through calculation based on an average packet receiving time interval corresponding to each time sub-time period in the reference time period. An average packet time interval variance $s^2$ may be calculated based on a plurality of average packet receiving time intervals according to the following formula:

$$s^2=[(s_1-s_0)+(s_2-s_0)+ \ldots +(s_{n-1}-s_0)+(s_n-s_0)]/n,$$
where $s_1, s_2, s_{n-1}, \ldots,$ and $s_n$ are n average packet receiving time intervals, n≥2, and $s_0$ is an average value of n average packet receiving time intervals.

For example, if there are 10 average packet receiving time intervals: $s_1, s_2, \ldots, s_{10}$, and an average value of the 10 average packet receiving time intervals is $s_0$, the average packet receiving time interval variance $s^2$ is calculated according to the following formula:

$$s^2=[(s_1-s_0)^2+(s_2-s_0)^2+ \ldots +(s_{10}-s_0)^2]/10$$

In a process of transmitting the audio and video stream in the streaming media manner, the audio and video stream is usually divided into a plurality of slices (data packets), so that the audio and video stream is transmitted in form of slices. A size of each slice is generally fixed. Therefore, the average packet receiving time interval and the average packet receiving time interval variance can reflect a network status, and further reflect the QoE of the audio and video stream. If the network status is good, the average packet receiving time interval is short, the variance is small, and the QoE is good. If the network status is poor, the average packet receiving time interval is long, the variance is large, and the QoE is poor.

Average delay: The average delay is an average value of delays corresponding to various data packets transmitted within the reference time period. During calculation, an average value of transmission times, between the transmit end and the receive end, of the various data packets received by the receive end is used as the average delay.

For any data packet, a transmission time of the any data packet between the transmit end and the receive end is a difference between a sending time and a receiving time, and the difference is a delay of the any data packet. J[i] represents a delay of an $i^{th}$ data packet, Arrive[i] represents a receiving time of the $i^{th}$ data packet, and Send[i] represents a sending time of the $i^{th}$ data packet. In this case, J[i]=Arrive[i]−Send[i].

The average delay is an average value of delays of a plurality of data packets. The average delay is calculated according to the following formula:

$$J=(J[1]+J[2]+ \ldots +J[n])/n, \text{ where}$$

$J[1], J[2], \ldots,$ and $J[n]$ are delays of n data packets, and n≥2.

For example, if there are four data packets, delays of the four data packets are respectively J[1], J[2], J[3], and J[4]. Therefore, the average delay J is calculated according to the following formula:

$$J=(J[1]+J[2]+J[3]+J[4])/4$$

Average jitter: The average jitter indicates fluctuation of a delay corresponding to each data packet in the reference time period. During calculation, a time difference between transmission times of every two adjacent data packets between the transmit end and the receive end is calculated to obtain a plurality of time differences, and an average value of the plurality of time differences is used as the average jitter.

The average jitter is used to indicate fluctuation of the delay. The average jitter is calculated according to the following formula:

$$\text{Average Jitter}=\{(|J[2]-J[1]|)+(|J[3]-J[2]|)+(|J[n]-J[n-1]|)\}/(n-1), \text{ where}$$

J[1], J[2], ..., and J[n] are delays of n data packets, and (n−1) is a quantity of time differences obtained through calculation based on the delays of the n data packets.

Assuming that delays of four data packets are J[1], J[2], J[3], and J[4], the average jitter can be calculated according to the following formula:

Average Jitter=$\{(|J[2]-J[1]|)+(|J[3]-J[2]|)+(|J[4]-J[3]|)\}/3$

Quantity of stream interruptions: The quantity of stream interruptions is a quantity of times that duration in which the receive end of the target audio and video stream receives no data packet in the reference time period is greater than a time threshold.

The quantity of stream interruptions is a quantity of stream interruptions within the reference time period. In this embodiment, that no data packet is received within the reference time period is considered as one stream interruption. For example, the reference time period is 60 s and the reference duration is 1 s, and if no data packet is received in a time period 10 s to 11 s or a time period 50 s to 51 s, the quantity of stream interruptions within the reference time period of 60 s is 2. Certainly, the reference duration is not limited in this embodiment. In addition to 1 s in the foregoing description, the reference duration may alternatively be another value.

In this embodiment, a reason of using the quantity of stream interruptions as one of the key indicators is as follows: In the process of transmitting the audio and video stream in the streaming media manner, a source code rate of the audio and video stream may be changed by a device for generating the audio and video stream, and transmission rates of different data packets included in the audio and video stream are different. This causes a frame freezing phenomenon. Indicators such as the packet loss rate, the average delay, and a throughput all reflect an overall frame freezing phenomenon in a time period, but cannot reflect a change of the frame freezing phenomenon at different time points in the time period. Therefore, the frame freezing phenomenon needs to be reflected, at a finer granularity, by using the quantity of stream interruptions.

In addition, if network quality deteriorates in the process of transmitting the audio and video stream, the transmit end of the audio and video stream terminates sending of a data packet, or re-establishes a connection to the receive end of the audio and video stream for transmitting a data packet. In this case, the frame freezing phenomenon also occurs. It can be learned that there are a plurality of cases that may cause the frame freezing phenomenon in the process of transmitting the audio and video stream. Therefore, the frame freezing phenomenon needs to be reflected, at a finer granularity, by using the quantity of stream interruptions.

202: Determine the QoE of the target audio and video stream based on the key indicator for the target audio and video stream.

In an example embodiment, the determining the QoE of the target audio and video stream based on the key indicator for the target audio and video stream includes but is not limited to determining a score of the target audio and video stream based on the key indicator for the target audio and video stream, and indicating different QoE by using different scores. This ensures that the determined QoE of the target audio and video stream has a relatively fine granularity.

In a possible implementation, the key indicator includes at least two indicators, and the process includes: determining a uniform reference unit for various indicators for the target audio and video stream, and performing weighted summation on the various indicators after the uniform reference unit is determined, to obtain a summation score; and using a difference between a full score and the summation score as a target score of the target audio and video stream, and indicating the QoE of the target audio and video stream by using the target score of the target audio and video stream, where the full score is used to indicate an upper limit of the QoE.

For example, in this embodiment, a reference unit corresponding to the packet loss rate is percentage (%), and reference units corresponding to the average packet receiving time interval, the average delay, and the average jitter are all millisecond. Using the average packet receiving time interval as an example, the average packet receiving time interval obtained through calculation is 0.02 s in a unit of second. In this case, before a target score is calculated by using the average packet receiving time interval, the value 0.02 s needs to be adjusted to 20 ms in a unit of millisecond. In addition, weights corresponding to various indicators are set or adjusted as required, and the weights corresponding to the various indicators are not limited in this embodiment.

It can be learned from the description in 2012 that there are a plurality of average packet receiving time intervals within the reference time period, and a respective obtained quantity of other six indicators other than the average packet receiving time interval is usually one within the reference time period. Therefore, when the key indicators include both the average packet receiving time interval and any one of the other six indicators, an average value of at least two average packet receiving time intervals within the reference time period is calculated in this embodiment, the average value of the average packet receiving time intervals is used as representative data of the average packet receiving time interval, and then a weight is set for the representative data. In a subsequent calculation process, weighted summation is performed based on the representative data and the weight corresponding to the representative data.

For ease of description, each indicator is represented by an abbreviation. Table 1 lists correspondences between abbreviations and indicators.

TABLE 1

| Full name | name | Abbreviation |
|---|---|---|
| Packet loss rate | loss rate | LR |
| Maximum quantity of continuously lost packets | loss max | LM |
| Average packet receiving time interval | receive time | RT |
| Average packet receiving time interval variance | square deviation of receive time | SRT |
| Quantity of stream interruptions | flow cut | FC |
| Average delay | delay | D |
| Average jitter | jitter | J |

According to Table 1, using an example in which the full score is represented as $R_0$, the target score R may be calculated according to the following formula:

$$R=R_0-(a_1 \cdot LR+a_2 \cdot LM+a_3 \cdot RT+a_4 \cdot SRT+a_5 \cdot FC+a_6 \cdot D+a_7 \cdot J)$$

The target score R can vary between 0 and $R_0$ by using different weights and indicators. A smaller difference between the target score R and the full score $R_0$, namely, a larger target score R, indicates better QoE indicated by the target score R. Correspondingly, a smaller difference between the target score R and 0, namely, a smaller target score R, indicates poorer QoE indicated by the target score R. For example, the full score $R_0$ may be set to 5, or may be set to another score.

For example, the full score $R_0$ is not set in this embodiment. After weighted summation is performed on the various indicators after the uniform reference unit is determined, an obtained summation score is directly used as the target score R'. In other words, R' is calculated according to the following formula:

$$R' = a_1 \cdot LR + a_2 \cdot LM + a_3 \cdot RT + a_4 \cdot SRT + a_5 \cdot FC + a_6 \cdot D + a_7 \cdot J$$

In this case, a larger target score R' indicates poorer QoE indicated by R'. Correspondingly, a smaller target score R' indicates better QoE indicated by R'.

It should be noted that, in a case of a plurality of average packet receiving time intervals, an averaging value of the plurality of average packet receiving time intervals may be obtained and used in weighted summation. Alternatively, the average packet receiving time intervals each may be used in the weighted summation. A calculation manner in which the average packet receiving time interval is used in the weighted summation is not limited in this embodiment.

In a possible implementation, the foregoing calculation process can be performed by using a model. To be specific, the determining QoE of the target audio and video stream based on the key indicator for the target audio and video stream includes: inputting the key indicator into a trained quality determining model; and using a score output by the quality determining model as a score of the target audio and video stream, and indicating the QoE of the target audio and video stream by using the score of the target audio and video stream.

Figure 3:
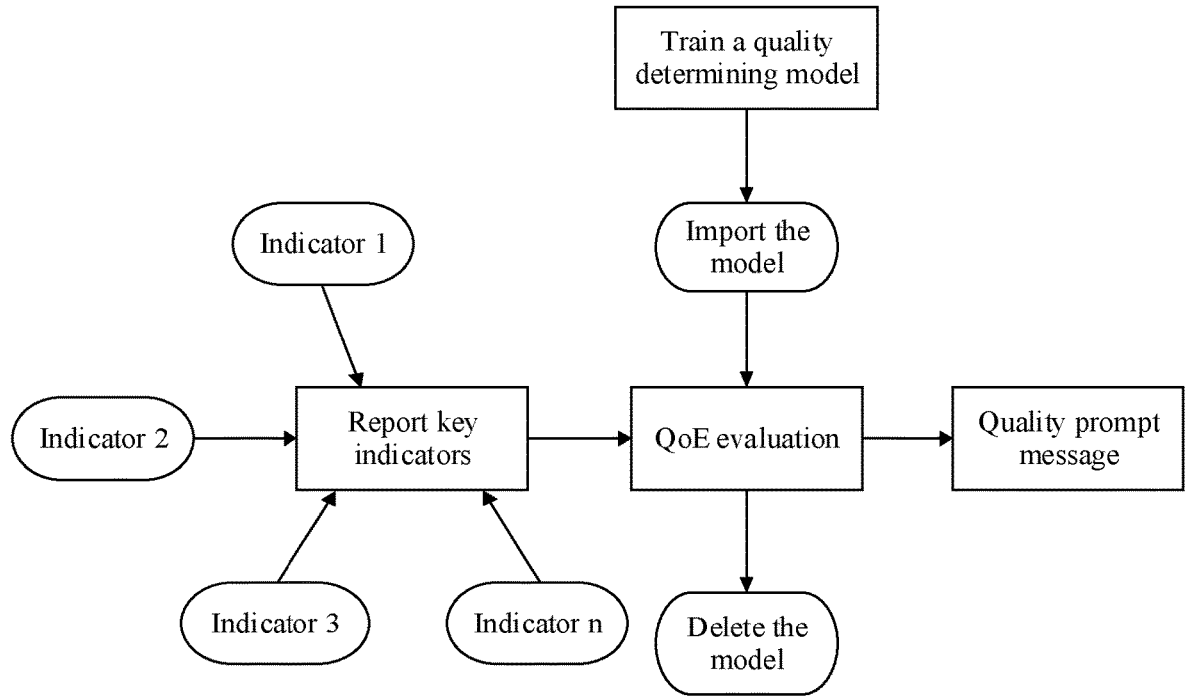
FIG. 3 is a flowchart of a method for determining quality of experience according to an embodiment of this application.

Referring to FIG. 3, first, a quality determining model is obtained through offline training, and the trained quality determining model has a capability of outputting respective scores based on various input indicators. For example, the quality determining model is a mathematical expression including a weight corresponding to each indicator. Then, the trained quality determining model is imported to a terminal. In an application process, the key indicator obtained through calculation based on the feature information is input into the quality determining model on the terminal, so that the trained quality determining model can perform calculation based on the weight corresponding to each indicator, to output a corresponding score. For example, referring to FIG. 3, after the trained quality determining model outputs the score, the trained quality determining model is further deleted from the network device. This avoids waste of storage resources of the network device.

In a possible implementation, referring to FIG. 3, after the determining QoE of the target audio and video stream based on the key indicator for the target audio and video stream, the method further includes: generating an alarm when the QoE of the target audio and video stream does not meet a requirement.

When QoE indicated by the target score is relatively poor, the QoE does not meet a requirement. A case in which a higher target score indicates better QoE is used as an example. If the target score is less than a threshold, it indicates that the QoE indicated by the target score does not meet a condition. Therefore, a quality prompt message of the target audio and video stream needs to be output. For example, the quality prompt message may be "quality of a current audio and video stream is poor, and timely adjustment is required", so that the current target audio and video stream is changed to an audio and video stream with a lower sampling rate. This ensures QoE of the target audio and video stream.

In conclusion, in this embodiment, the QoE of the audio and video stream is determined by using at least one of the following indicators: the maximum quantity of continuously lost packets, the average packet receiving time interval, the average packet receiving time interval variance, and the quantity of stream interruptions, and the determined QoE is relatively accurate. In addition, weighted summation is further performed on the various indicators after a uniform reference unit is determined, and the target score is calculated based on the summation score. Then, the QoE is indicated by using the target score, so that the QoE has a relatively fine granularity.

Figure 4:
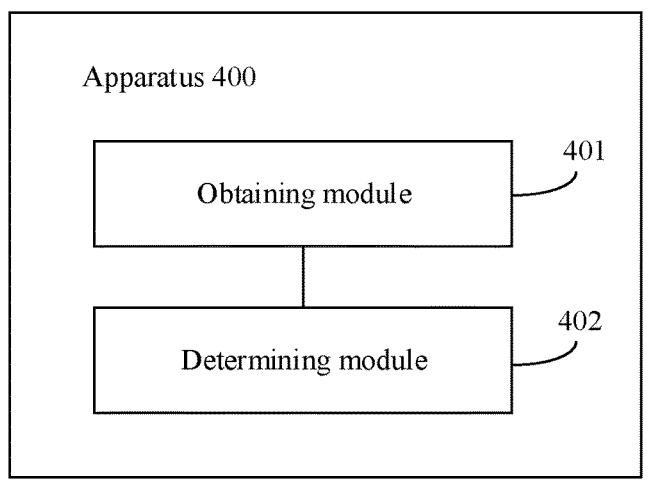
FIG. 4 is a structural diagram of an apparatus for determining quality of an audio and video stream according to an embodiment of this application.

As shown in FIG. 4, an embodiment of this application further provides an apparatus 400 for determining quality of an audio and video stream. The apparatus 400 is configured to perform the method for determining quality of an audio and video stream shown in FIG. 2. The apparatus 400 includes: an obtaining module 401, configured to obtain a key indicator for a target audio and video stream. The key indicator includes at least one of the following indicators within a reference time period: a maximum quantity of continuously lost packets, an average packet receiving time interval, an average packet receiving time interval variance, or a quantity of stream interruptions. For a function performed by the obtaining module 401, refer to the related descriptions of 201 shown in FIG. 2. Details are not described herein again.

The apparatus 400 further includes a determining module 402 configured to determine a QoE of the target audio and video stream based on the key indicator for the target audio and video stream. For a function performed by the determining module 402, refer to the related descriptions of 202 shown in FIG. 2. Details are not described herein again.

In a possible implementation, the obtaining module 401 is configured to collect feature information of the target audio and video stream. The feature information includes a quantity of data packets received by a receive end of the target audio and video stream in the reference time period and includes a sequence number corresponding to the data packet received by the receive end. The obtaining module 401 calculates, based on the feature information, at least one of the following indicators: the maximum quantity of continuously lost packets, the average packet receiving time interval, the average packet receiving time interval variance, and the quantity of stream interruptions, and use at least one indicator obtained through calculation as the key indicator for the target audio and video stream.

In a possible implementation, the maximum quantity of continuously lost packets is used to indicate a maximum quantity of continuously lost data packets of the target audio and video stream within the reference time period, and the lost data packet is a data packet that has been sent by a transmit end of the target audio and video stream but has not been received by the receive end of the target audio and video stream.

In a possible implementation, the average packet receiving time interval is used to indicate an average value of a plurality of receiving time intervals that are used for receiving the target audio and video stream and that are in any sub-time period in the reference time period, and each of the plurality of receiving time intervals is used to indicate an interval between time points for receiving two adjacent data packets.

In a possible implementation, the average packet receiving time interval variance is a variance of a plurality of average packet receiving time intervals within the reference time period, and one of the plurality of average packet receiving time intervals corresponds to one sub-time period in the reference time period.

In a possible implementation, the quantity of stream interruptions is a quantity of times that duration in which the receive end of the target audio and video stream receives no data packet within the reference time period is greater than a time threshold.

In a possible implementation, the key indicator further includes at least one of the following indicators: a packet loss rate, an average delay, and an average jitter.

In a possible implementation, the key indicator includes at least two indicators. The determining module 402 is configured to: determine a uniform reference unit for various indicators for the target audio and video stream, and perform weighted summation based on the various indicators after the uniform reference unit is determined, to obtain a summation score; and use a difference between a full score and the summation score as a score of the target audio and video stream, and indicate the QoE of the target audio and video stream by using the score of the target audio and video stream, where the full score is used to indicate an upper limit of the QoE.

In a possible implementation, the determining module 402 is configured to: input the key indicator into a trained quality determining model; and use a score output by the quality determining model as a score of the target audio and video stream, and indicate the QoE of the target audio and video stream by using the score of the target audio and video stream.

In a possible implementation, the apparatus 400 further includes: an alarm module, configured to generate an alarm when the QoE of the target audio and video stream does not meet a requirement.

In conclusion, in this embodiment, the QoE of the audio and video stream is determined by using at least one of the following indicators: the maximum quantity of continuously lost packets, the average packet receiving time interval, the average packet receiving time interval variance, and the quantity of stream interruptions, and the determined QoE is relatively accurate. In addition, weighted summation is further performed on the various indicators after a uniform reference unit is determined, and the target score is calculated based on the summation score. Then, the QoE is indicated by using the target score, so that the QoE has a relatively fine granularity.

It should be understood that, when the apparatus 400 provided in FIG. 4 implement functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatus 400 provided in the foregoing embodiment and the method embodiment are provided based on a same concept. For a specific implementation process of the apparatus 400, refer to the method embodiment. Details are not described herein again.

An embodiment of this application provides an electronic device. The electronic device includes a memory and a processor. The memory stores at least one instruction, and the processor loads and executes the at least one instruction to implement the method provided in any example embodiment of this application.

Figure 5:
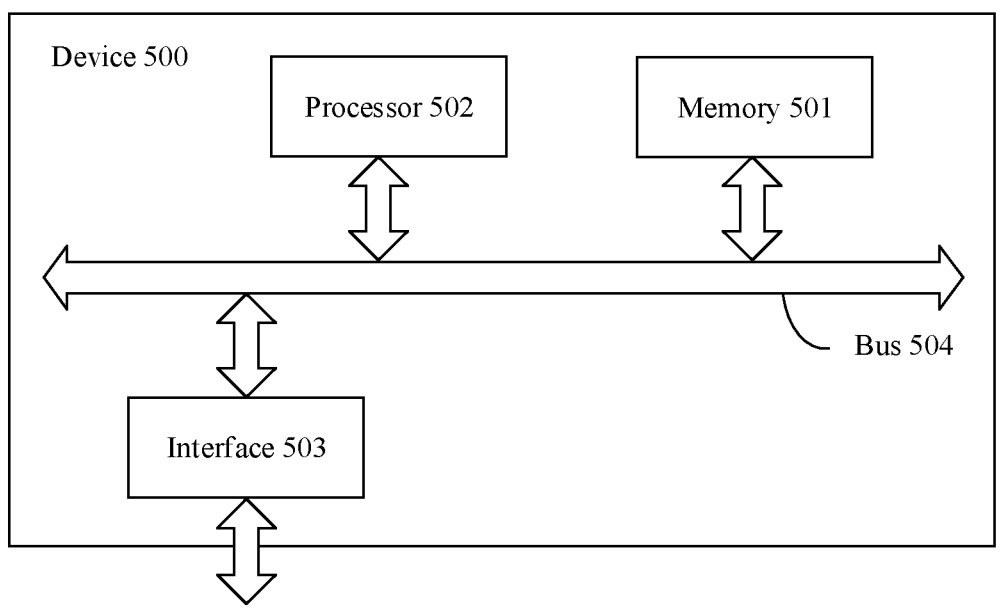
FIG. 5 is a structural diagram of a device for determining quality of an audio and video stream according to an embodiment of this application.

Referring to FIG. 5, an embodiment of this application further provides a device 500 for determining quality of an audio and video stream. The device 500 for determining quality of an audio and video stream shown in FIG. 5 is configured to perform operations related to the method for determining quality of an audio and video stream. The device 500 for determining quality of an audio and video stream includes: a memory 501, a processor 502, and an interface 503. The memory 501, the processor 502, and the interface 503 are connected through a bus 504.

The memory 501 stores instructions, and the processor 502 loads and executes the instructions to implement any one of the foregoing methods for determining quality of an audio and video stream.

The interface 503 is used for wireless or wired communication with another device in a network. For example, the interface 503 may be a network adapter. For example, the device 500 for determining quality of an audio and video stream may communicate with a server through the interface 503.

It should be understood that FIG. 5 shows only a simplified design of the device 500 for determining quality of an audio and video stream. During actual application, the device 500 for determining quality of an audio and video stream may include any quantity of interfaces, processors, or memories. In addition, the processor may be a central processing unit (CPU), or may be another general purpose processor, a digital signal processor (DSP), an application-specific integrated circuit (ASIC), a field-programmable gate array (FPGA), or another programmable logic device, a discrete gate or transistor logic device, a discrete hardware component, or the like. The general purpose processor may be a microprocessor, any conventional processor or the like. It should be noted that the processor may be a processor that supports an advanced RISC machines (ARM) architecture.

Further, in an optional embodiment, the memory may include a read-only memory and a random access memory, and provide an instruction and data to the processor. The memory may further include a non-volatile random access memory. For example, the memory may further store information of a device type.

An embodiment of this application provides a communications apparatus. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method provided in any one of the example embodiments of this application.

Optionally, there are one or more processors and one or more memories.

Optionally, the memory may be integrated with the processor, or the memory and the processor may be separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

An embodiment of this application provides a computer program product. The computer program product includes computer program code. When the computer program code is run by a computer, the computer is enabled to perform the method provided in any one of the foregoing example embodiments of this application.

An embodiment of this application provides a computer-readable storage medium. The computer-readable storage medium stores programs or instructions. When the programs or the instructions are run on a computer, the method provided in any one of the example embodiments of this application is performed.

An embodiment of this application provides a chip, including a processor, configured to invoke and run instructions stored in a memory, so that a communications device in which the chip is installed performs the method provided in any one of the example embodiments of this application.

An embodiment of this application provides a chip, including an input interface, an output interface, a processor, and a memory. The input interface, the output interface, the processor, and the memory are connected to each other through an internal connection channel. The processor is configured to execute code in the memory. When the code is executed, the processor is configured to perform the method provided in any one of the example embodiments of this application.

It should be understood that the processor may be a central processing unit (CPU), or may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, any conventional processor or the like. It should be noted that the processor may be a processor that supports an advanced RISC machines (ARM) architecture.

Further, in an optional embodiment, the memory may include a read-only memory and a random access memory, and provide an instruction and data to the processor. The memory may further include a non-volatile random access memory. For example, the memory may further store information of a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. For example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

This application provides computer programs. When the computer programs are executed by a computer, a processor or the computer may be enabled to perform corresponding steps and/or procedures in the foregoing method embodiments.

All or some of the foregoing embodiments may be implemented by using software, hardware, firmware, or any combination thereof in the foregoing embodiments. When software is used for implementation, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive (SSD)), or the like.

What is claimed is:

1. A method for determining quality of an audio and video stream, the method comprising:
    obtaining a key indicator within a reference time period for a target audio and video stream, the key indicator comprising a maximum quantity of continuously lost packets, the obtaining the key indicator comprising:
        obtaining a maximum quantity of continuously lost packets value for each sub-time period of a plurality of sub-time periods in the reference time period; and
        selecting a largest maximum quantity of continuously lost packets value as the maximum quantity of continuously lost packets; and
    determining a quality of experience (QoE) of the target audio and video stream based on the key indicator.

2. The method according to claim 1, wherein the obtaining the key indicator for the target audio and video stream comprises:
    collecting feature information of the target audio and video stream, the feature information comprising a quantity of data packets received by a receive end of the target audio and video stream within the reference time period and comprising a sequence number corresponding to the data packet received by the receive end.

3. The method according to claim 1, wherein the maximum quantity of continuously lost packets indicates a maximum quantity of continuously lost data packets of the target audio and video stream within the reference time period, and the lost data packet comprises a data packet that has been sent by a transmit end of the target audio and video stream but has not been received by the receive end of the target audio and video stream.

4. The method according to claim 1, wherein the average packet receiving time interval indicates an average value of a plurality of receiving time intervals that are used for receiving the target audio and video stream and that are in any sub-time period in the reference time period, and each time interval of the plurality of receiving time intervals indicates an interval between time points for receiving two adjacent data packets.

5. The method according to claim 1, wherein the key indicator further comprises at least one of the following indicators: a packet loss rate, an average delay, or an average jitter.

6. The method according to claim 1, the key indicator comprising at least two indicators, and the determining the quality of experience (QoE) of the target audio and video stream based on the key indicator comprises:
   determining a uniform reference unit for various indicators for the target audio and video stream;
   performing weighted summation on the various indicators after the uniform reference unit is determined to obtain a summation score;
   using a difference between a full score and the summation score as a score of the target audio and video stream; and
   indicating the QoE of the target audio and video stream using the score of the target audio and video stream, wherein the full score indicates an upper limit of the QoE.

7. The method according to claim 1, wherein the determining the quality of experience (QoE) of the target audio and video stream based on the key indicator comprises:
   inputting the key indicator into a trained quality determining model;
   using a score output by the quality determining model as a score of the target audio and video stream; and
   indicating the QoE of the target audio and video stream using the score.

8. The method according to claim 1, wherein after the determining quality of experience (QoE) of the target audio and video stream based on the key indicator, the method further comprising:
   generating an alarm when the QoE of the target audio and video stream does not meet a requirement.

9. A network device, the network device comprising:
   a memory storing instructions; and
   a processor coupled to the memory, the processor is configured to execute the instructions to implement:
   obtaining a key indicator within a reference time period for a target audio and video stream, the key indicator comprising a maximum quantity of continuously lost packets, the obtaining the key indicator comprising:
      obtaining a maximum quantity of continuously lost packets value for each sub-time period of a plurality of sub-time periods in the reference time period; and
      selecting a largest maximum quantity of continuously lost packets value as the maximum quantity of continuously lost packets; and
   determining a quality of experience (QoE) of the target audio and video stream based on the key indicator.

10. The network device according to claim 9, wherein the processor further executes the instructions to implement:
    collecting feature information of the target audio and video stream, the feature information comprising a quantity of data packets received by a receive end of the target audio and video stream within the reference time period and comprising a sequence number corresponding to the data packet received by the receive end.

11. The network device according to claim 9, wherein the maximum quantity of continuously lost packets indicates a maximum quantity of continuously lost data packets of the target audio and video stream within the reference time period, and the lost data packet comprises a data packet that has been sent by a transmit end of the target audio and video stream but has not been received by the receive end of the target audio and video stream.

12. The network device according to claim 9, wherein the average packet receiving time interval indicates an average value of a plurality of receiving time intervals that are used for receiving the target audio and video stream and that are in any sub-time period in the reference time period, and each time interval of the plurality of receiving time intervals indicates an interval between time points for receiving two adjacent data packets.

13. The network device according to claim 9, wherein the key indicator further comprises at least one of the following indicators: a packet loss rate, an average delay, or an average jitter.

14. The network device according to claim 9, the key indicator comprising at least two indicators, and wherein the processor further executes the instructions to implement:
    determining a uniform reference unit for various indicators for the target audio and video stream;
    performing weighted summation on the various indicators after the uniform reference unit is determined to obtain a summation score;
    using a difference between a full score and the summation score as a score of the target audio and video stream; and
    indicating the QoE of the target audio and video stream using the score of the target audio and video stream, wherein the full score indicates an upper limit of the QoE.

15. The network device according to claim 9, wherein the processor further executes the instructions to implement:
    inputting the key indicator into a trained quality determining model;
    using a score output by the quality determining model as a score of the target audio and video stream; and
    indicating the QoE of the target audio and video stream using the score.

16. The network device according to claim 9, wherein the processor further executes the instructions to implement:
    generating an alarm when the QoE of the target audio and video stream does not meet a requirement.

17. A non-transitory computer-readable storage medium comprising instructions which, when executed by a computer, cause the computer to carry out the following steps:
    obtaining a key indicator within a reference time period for a target audio and video stream, the key indicator comprising a maximum quantity of continuously lost packets, the obtaining the key indicator comprising:
       obtaining a maximum quantity of continuously lost packets value for each sub-time period of a plurality of sub-time periods in the reference time period; and
       selecting a largest maximum quantity of continuously lost packets value as the maximum quantity of continuously lost packets; and
    determining a quality of experience (QoE) of the target audio and video stream based on the key indicator.

18. The method according to claim 1, wherein the maximum quantity of continuously lost packets comprises a maximum sequence number difference in packet sequence numbers of received packets received during the reference time period.

19. The network device according to claim 9, wherein the maximum quantity of continuously lost packets comprises a maximum sequence number difference in packet sequence numbers of received packets received during the reference time period.

\* \* \* \* \*